United States Patent
Tsuruhara et al.

(10) Patent No.: US 7,472,012 B2
(45) Date of Patent: Dec. 30, 2008

(54) TRACTION CONTROL DEVICE

(75) Inventors: Ryuzo Tsuruhara, Kariya (JP); Yasumi Inoue, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 831 days.

(21) Appl. No.: 10/947,136

(22) Filed: Sep. 23, 2004

(65) Prior Publication Data
US 2005/0065702 A1 Mar. 24, 2005

(30) Foreign Application Priority Data
Sep. 24, 2003 (JP) ............................. 2003-331484

(51) Int. Cl.
 B60T 7/12 (2006.01)
 G06F 7/00 (2006.01)
 G06F 17/00 (2006.01)
 G05D 1/00 (2006.01)
(52) U.S. Cl. ............................. 701/82; 701/74; 701/84; 702/148; 123/320; 180/197
(58) Field of Classification Search ................... 701/82, 701/84, 74; 702/148; 180/197; 123/320
See application file for complete search history.

(56) References Cited

U.S. PATENT DOCUMENTS

| | | | | | |
|---|---|---|---|---|---|
| 4,075,538 | A | * | 2/1978 | Plunkett | 318/52 |
| 5,000,280 | A | * | 3/1991 | Wazaki et al. | 180/197 |
| 5,169,213 | A | * | 12/1992 | Matsuda et al. | 303/113.2 |
| 5,197,008 | A | * | 3/1993 | Itoh et al. | 701/70 |
| 5,225,982 | A | * | 7/1993 | Ito et al. | 701/91 |
| 5,243,526 | A | * | 9/1993 | Ito et al. | 701/90 |
| 5,245,542 | A | * | 9/1993 | Itoh et al. | 701/90 |
| 5,255,192 | A | * | 10/1993 | Ito et al. | 701/90 |
| 5,276,624 | A | * | 1/1994 | Ito et al. | 701/72 |

(Continued)

FOREIGN PATENT DOCUMENTS

DE 3929497 C * 11/1991

(Continued)

OTHER PUBLICATIONS

The challenges of using variable-speed motor drives in appliance applications; Persson, Eric; Kulatunga, Athula; Sundararajan, Raji; Electrical Insulation Conference and Electrical Manufacturing Expo, 2007; Oct. 22-24, 2007 pp. 453-458; Digital Object Identifier 10.1109/EEIC.2007.4562659.*

(Continued)

*Primary Examiner*—Cuong H Nguyen
(74) *Attorney, Agent, or Firm*—Posz Law Group, PLC (57) ABSTRACT

A newly obtained wheel speed of a drive wheel is not used in a calculation for acceleration slip when a vehicle is stopped, for example, when the wheel speed of a rolling wheel is zero and an engine speed is high. A wheel speed calculated before a previous wheel speed is, for example, set as a current wheel speed. In this manner, even if the wheel speed of a driving wheel is due to the effect of racing noise, it is possible to limit erroneous determinations that indicate acceleration slip is being generated, based upon such a wheel speed. In addition, unnecessary execution of a traction control can also be curbed.

22 Claims, 3 Drawing Sheets

U.S. PATENT DOCUMENTS

| | | | | |
|---|---|---|---|---|
| 5,365,444 | A | * | 11/1994 | Suzuki et al. .................. 701/74 |
| 5,429,428 | A | * | 7/1995 | Yasuda ....................... 303/139 |
| 5,748,503 | A | | 5/1998 | Saeki et al. |
| 6,002,979 | A | * | 12/1999 | Ishizu .......................... 701/86 |
| 6,292,734 | B1 | * | 9/2001 | Murakami et al. ............. 701/84 |
| 6,370,466 | B1 | * | 4/2002 | Hada et al. .................... 701/70 |
| 6,782,961 | B1 | * | 8/2004 | Ishikawa et al. ............ 180/197 |
| 6,931,316 | B2 | * | 8/2005 | Joe et al. ....................... 701/61 |
| 7,058,498 | B2 | * | 6/2006 | Kano et al. .................... 701/67 |
| 2001/0008192 | A1 | * | 7/2001 | Morisawa .................... 180/197 |
| 2004/0140174 | A1 | * | 7/2004 | Kano et al. ............. 192/104 R |
| 2005/0065702 | A1 | * | 3/2005 | Tsuruhara et al. ............. 701/82 |
| 2005/0125134 | A1 | * | 6/2005 | Iwatsuki et al. ............... 701/70 |
| 2006/0219454 | A1 | * | 10/2006 | Itoh et al. ................... 180/197 |

FOREIGN PATENT DOCUMENTS

| | | | | |
|---|---|---|---|---|
| JP | A-H05-86920 | | | 4/1993 |
| JP | 08205307 | A | * | 8/1996 |
| JP | A-09-021818 | | | 1/1997 |
| JP | A-09-109868 | | | 4/1997 |
| JP | 2003165432 | A | * | 6/2003 |
| JP | 2005096552 | A | * | 4/2005 |
| JP | 2005132187 | A | * | 5/2005 |
| WO | WO 2004022950 | A1 | * | 3/2004 |

OTHER PUBLICATIONS

Some notes on the necessity to extend the vibro-acoustical tests of rotating electrical machines used in variable-speed drives Timar, P.L.; Hallenius, K.-E.; Industry Applications Society Annual Meeting, 1988., Conference Record of the 1988 IEEE; Oct. 2-7, 1988 pp. 124-128 vol. 1; Digital Object Identifier 10.1109/IAS.1988.25051.*

The application of acoustic ranging to the automatic control of a ground vehicle; Clemence, G.T.; Hurlbut, G.W.; Vehicular Technology Conference, 1982. 32nd IEEE; vol. 32, May 23-26, 1982 pp. 49-54.*

A Transmission-Line Based Technique for De-Embedding Noise Parameters; Yau, K.H.K.; Mangan, A.M.; Chevalier, P.; Schvan, P.; Voinigescu, S.P.; Microelectronic Test Structures, 2007. ICMTS '07. IEEE International Conference on Mar. 19-22, 2007 pp. 237-242; Digital Object Identifier 10.1109/ICMTS.2007.374491.*

Acoustic noise in induction motors: causes and solutions; Nau, S.L.; Mello, H.G.G.; Petroleum and Chemical Industry Conference, 2000. Record of Conference Papers. Industry Applications Society 47th Annual; Sep. 11-13, 2000 pp. 253-263; Digital Object Identifier 10.1109/PCICON.2000.882782.*

Acoustic emissions in broadband vibration as an indicator of bearing stress; Goodenow, T.; Hardman, W.; Karchnak, M.; Aerospace Conference Proceedings, 2000 IEEE; vol. 6, Mar. 18-25, 2000 pp. 95-122 vol. 6; Digital Object Identifier 10.1109/AERO.2000.877886.*

Adaptive neural network-based state filter for induction motor speed estimation; Bharadwaj, R.M.; Parlos, A.G.; Toliyat, H.A.; Industrial Electronics Society, 1999. IECON '99 Proceedings. The 25th Annual Conference of the IEEE; vol. 3, Nov. 29-Dec. 3, 1999 pp. 1283-1288 vol. 3; Digital Object Identifier 10.1109/IECON.1999.819396.*

Detection of rolling-element bearing signal corrupted by noise of similar frequency using adaptive noise cancellation Tan, C.C.; Okada, Y.;Information, Communications and Signal Processing, 1997. ICICS., Proceedings of 1997 International Conference on;vol. 1, Sep. 9-12, 1997 pp. 108-112 vol. 1;Digital Object Identifier 10.1109/ICICS.1997.*

Office Action dated May 7, 2008 in corresponding Japanese patent application No. 2003-331484 (and English translation).

* cited by examiner

TRACTION CONTROL DEVICE

CROSS REFERENCE TO RELATED APPLICATION

This application is based upon and claims the benefit of Japanese Patent Application No. 2003-331484 filed on Sep. 24, 2003, the content of which are incorporated herein by reference.

FIELD OF THE INVENTION

The present invention relates to a traction control device capable of suppressing acceleration slip of a wheel generated during acceleration of a vehicle.

BACKGROUND OF THE INVENTION

There are traction control devices (refer to Japanese Patent Laid-Open Publication No. 05-86920 for an example) in which the acceleration slip of wheels is detected based upon the detection output from respective wheel speed sensors installed in an ABS (anti-skid brake system). Thus, the acceleration slip is suppressed by the traction control devices.

In such traction control devices, for example, a brake ECU for controlling an ABS actuator receives detection signals from each wheel speed sensor, as well as detection signals sent from a vehicle speed sensor via a power train module (equivalent to an engine ECU and hereinafter referred to as "PCM"). The brake ECU detects acceleration slip based upon the wheel speed and vehicle speed. If acceleration slip is detected, a signal indicating the acceleration slip is sent to the PCM and the brake ECU. Accordingly, the engine control amount is adjusted to lower engine output, and a motor and electromagnetic valves mounted in the ABS actuator are driven to generate a braking force in the wheels. Hence, the driving force generated in the wheels is reduced, suppressing acceleration slip.

Racing the engine when the vehicle is stopped transmits vibrations caused by rotation of the engine or the like to rotors installed in each wheel, via a drive shaft or the like. Accordingly, noise (a so-called racing noise) caused by such vibrations is included in the detection signal of the wheel speed sensor, which obtains a wheel speed detection signal based upon the rotation of the rotor. Therefore, the brake ECU obtains an erroneous detection result indicating that the wheel is rotating, despite the stopped state of the vehicle, from the detection signal of the wheel speed sensor affected by noise. A problem arises when the brake ECU executes traction control based upon this erroneous detection.

In such cases where the traction control is unnecessarily executed, for example, when the engine output is lowered through an engine control, the engine does not race, despite the attempt to make it do so. Furthermore, the driving sound of the motor and electromagnetic valves mounted in the ABS actuator when driven is audible even though there is no need for traction control.

SUMMARY OF THE INVENTION

It is an object of the present invention to curb unnecessary execution of a traction control when a vehicle is stopped.

According to a first aspect of the present invention, the reduction of a driving force cause by a driving force reduction mechanism is stopped in cases where an engine speed detected by an engine speed detection mechanism exceeds a predetermined speed.

As described above, the engine speed is detected, and racing noise is assumed as affecting a wheel speed of a drive wheel detected by a wheel speed detection mechanism when the engine speed exceeds the predetermined speed. Therefore, a traction control is not initiated, making it possible to prevent unnecessary execution of the traction control based upon racing noise when the vehicle is stopped.

In this case, it is preferable that an acceleration slip detection mechanism stops detection of acceleration slip based upon the wheel speed detected by the wheel speed detection mechanism when it is determined by a vehicle stop determination mechanism that the vehicle is stopped.

If the detection of acceleration slip based upon the wheel speed detected by the wheel speed detection mechanism is stopped in this manner, it is possible to ensure that the traction control is not initiated. For example, the detection of acceleration slip can be stopped by halting reading of the wheel speed by the wheel speed detection mechanism.

In addition, it is preferable to calculate the wheel speed every predetermined control cycle by the wheel speed detection mechanism, and stop reduction of the driving force by the driving force reduction mechanism in cases where the calculated wheel speed increases and subsequently decreases within a first set of control cycles.

If the increase in wheel speed is due to racing noise, a wheel speed that increases within the first set of control cycles, for example, 5 control cycles, will decrease. Therefore, it can be assumed that racing noise causes the increase in wheel speed if the wheel speed decreases within the first control cycle, ensuring that the traction control is not initiated.

In addition, when the wheel speed is calculated every predetermined control cycle by the wheel speed detection mechanism and the calculated wheel speed continues to show an increasing tendency for more than a second set of control cycles, it is possible to make the driving force reduction mechanism cancel the stop on reduction of driving force and starts reducing the driving force.

When the wheel speed continues to show an increasing tendency for more than the second set of control cycles, for example, 5 control cycles, that is, in cases where the wheel speed increases or maintains the wheel speed of the previous control cycle, it can be assumed that such a wheel speed is not due to racing noise, but is an actual wheel speed. Therefore, it is possible to ensure that the traction control is initiated, if the wheel speed shows an increasing tendency for more than the second set of control cycles.

The reduction of the driving force by the driving force reduction mechanism may be stopped in cases where the calculated wheel speed continues to increase and decrease.

More specifically, among the wheel speeds calculated every predetermined control cycle in the wheel speed detection mechanism, in cases where an absolute value of a difference between a current wheel speed newly calculated and a previous wheel speed previously calculated is equal to or greater than a predetermined value, and an absolute value of a difference between the previous wheel speed and a wheel speed before the previous wheel speed, which is calculated prior to the previous wheel speed, is equal to or greater than the predetermined value, the wheel speed before the previous wheel speed is set as a new wheel speed. Thus, it is possible to stop reduction of the driving force by the driving force reduction mechanism.

In addition, a value smaller than the current wheel speed may be set as the new wheel speed in one of a case where the absolute value of the difference between the current wheel speed and the previous wheel speed is equal to or greater than the predetermined value, and a case where the absolute value of the difference between the previous wheel speed and the wheel speed before the previous wheel speed is equal to or greater than the predetermined value. Thus, it is possible to stop reduction of the driving force by the driving force reduction mechanism.

Furthermore, the current wheel speed may be set as the new wheel speed in cases where the absolute value of the difference between the current wheel speed and the previous wheel speed is smaller than the predetermined value, and the absolute value of the difference between the previous wheel speed and the wheel speed before the previous wheel speed is smaller than the predetermined value. In such a case, it is assumed that the current wheel speed is not generated by the effect of racing noise, and the current wheel speed is unchanged and used as the new wheel speed.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

First Embodiment

Figure 1:
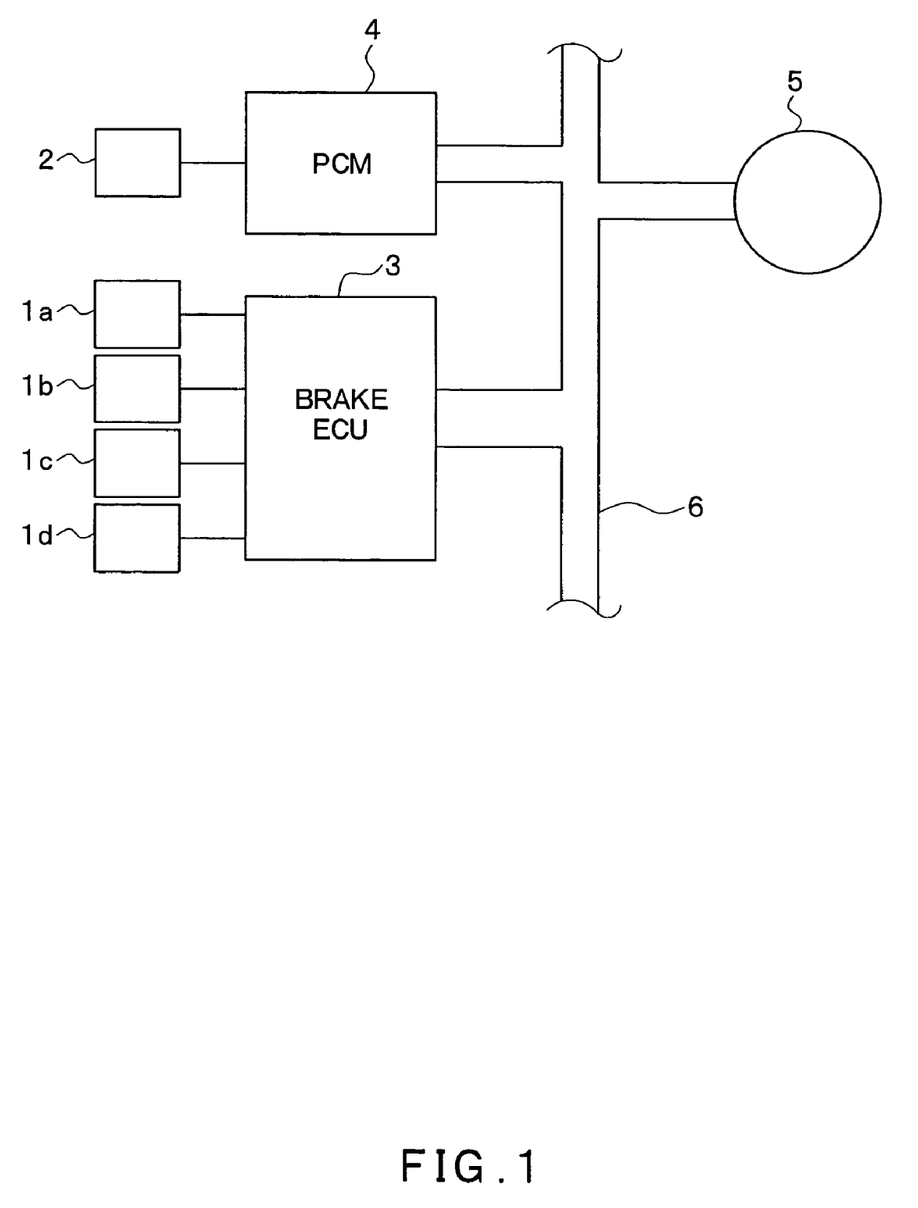
FIG. 1 is a block diagram showing a traction control system according to a first embodiment of the present invention.

FIG. 1 is a block diagram of a traction control system to which an embodiment of the present invention is applied.

A traction control system according to a first embodiment of the present invention will be explained with reference to this drawing.

The traction control system includes a brake ECU 3 for an ABS control and a traction control in order to drive an ABS actuator and various sensor groups 1a-1d and 2 installed in a vehicle, a PCM 4 for controlling engine output, a traction control operation lamp 5, and a serial communication line 6 for connecting these structures.

Wheel speed sensors 1a-1d and an engine speed sensor 2 form the various sensor groups 1a-1d and 2.

The wheel speed sensors 1a-1d are installed in wheels mounted on a vehicle. Furthermore, a plurality of the wheel speed sensors 1a-1d are configured to output corresponding pulse signals serving as wheel speed signals for each wheel. Each wheel speed signal is used in calculations such as the calculation of the wheel speed for each wheel, the vehicle body speed, and the slip ratio.

The engine speed sensor 2 is used for finding a speed of an engine that serves as a source of power for generating a driving force. Note that the present embodiment is structured to include the engine speed sensor 2, however, it is also possible to estimate the engine speed based upon an engine control signal output by the PCM 4.

The brake ECU 3 is a microcomputer equipped with a built-in memory and counter. the brake ECU 3 executes braking force control, e.g., a brake control corresponding to an operation amount of a brake pedal (not shown). A brake control signal is output from the brake ECU 3 to the ABS actuator, for example, to apply control voltage to a solenoid for driving electromagnetic valves and a motor mounted in the ABS actuator. Accordingly, brake hydraulic pressure generated in a wheel cylinder (W/C) is controlled to control the braking force generated in each wheel.

More specifically, the brake ECU 3 receives a wheel speed signal from the wheel speed sensors 1a-1d. After calculating the wheel speed and vehicle body speed based upon the wheel speed signals, the calculated wheel speed is stored in a memory. The brake ECU 3 is also designed to detect a locking tendency and acceleration slip of the wheel based upon a slip ratio found from the stored data and output a brake control signal to the ABS actuator, in order to execute the traction control for avoiding acceleration slip or the ABS control for avoiding a locking tendency. Namely, to suppress acceleration slip with the traction control, the pressure of the W/C of the drive wheel is increased so as to reduce the driving force transmitted to the drive wheel. To avoid a locking tendency with the ABS control, the pressure of the W/C of the wheel that may lock is reduced and held, while the pulse increased.

Note that a unit of the brake ECU 3 performing the wheel speed calculation and the wheel speed sensors 1a-1d are equivalent to a wheel speed detection mechanism. Likewise, a unit of the brake ECU 3 that calculates acceleration slip based upon the wheel speed and the vehicle body speed is equivalent to an acceleration slip detection mechanism. Furthermore, a unit within the brake ECU 3 that outputs a brake signal to the ABS actuator for executing the traction control is equivalent to a driving force reduction mechanism.

The PCM 4 is a microcomputer equipped with a built-in memory and counter. The PCM 4A executes driving force adjustment such as an engine control corresponding to an operation amount of an accelerator pedal (not shown). The PCM 4 outputs an engine control signal that indicates a driving force command value, and the engine control is executed based upon the engine control signal.

In addition, various calculations are performed in the PCM 4, including an engine speed calculation based upon a detection signal from the engine speed sensor 2 and other control signals. The engine control signal is adjusted in accordance with these calculation results.

For example, the PCM 4 sets the engine output based upon an operation amount of the accelerator pedal, thereby generating a corresponding engine control signal. However, during execution of the traction control, the PCM 4 is configured so as to perform a calculation in order to decrease the engine output, and output an engine control signal in accordance with the calculation result. Based upon the engine control signal, controls such as adjusting the engine speed, torque, and the like are adjusted to lower the engine output, thus reducing the driving force.

Note that a unit of the PCM 4 performing the engine speed calculation and the engine speed sensor 2 are equivalent to an engine speed detection mechanism. Furthermore, a unit within the PCM 4 that outputs a control signal to the engine for executing the traction control forms a driving force reduction mechanism along with a portion of the brake ECU 3.

The traction control operation lamp 5 is installed in the area of the instrument panel, and indicates operation of the traction control by lighting up.

The serial communication line 6 connects the brake ECU 3, the PCM 4, a control ECU (not shown) installed in the vehicle and the like, serving as the communication line between each structural component. The brake ECU 3 and the PCM 4 communicate through the serial communication line 6, and both confirm whether the other is functioning normally. In addition, signals from the brake ECU 3 and the PCM 4 are received by the traction control operation lamp 5 via the serial communication line 6 so as to obtain data indicating execution of the traction control.

Next, a wheel speed setting process executed by the traction control system structured as described above will be explained with reference to a flowchart of the process shown in FIGS. 2A and 2B.

Figure 2A:
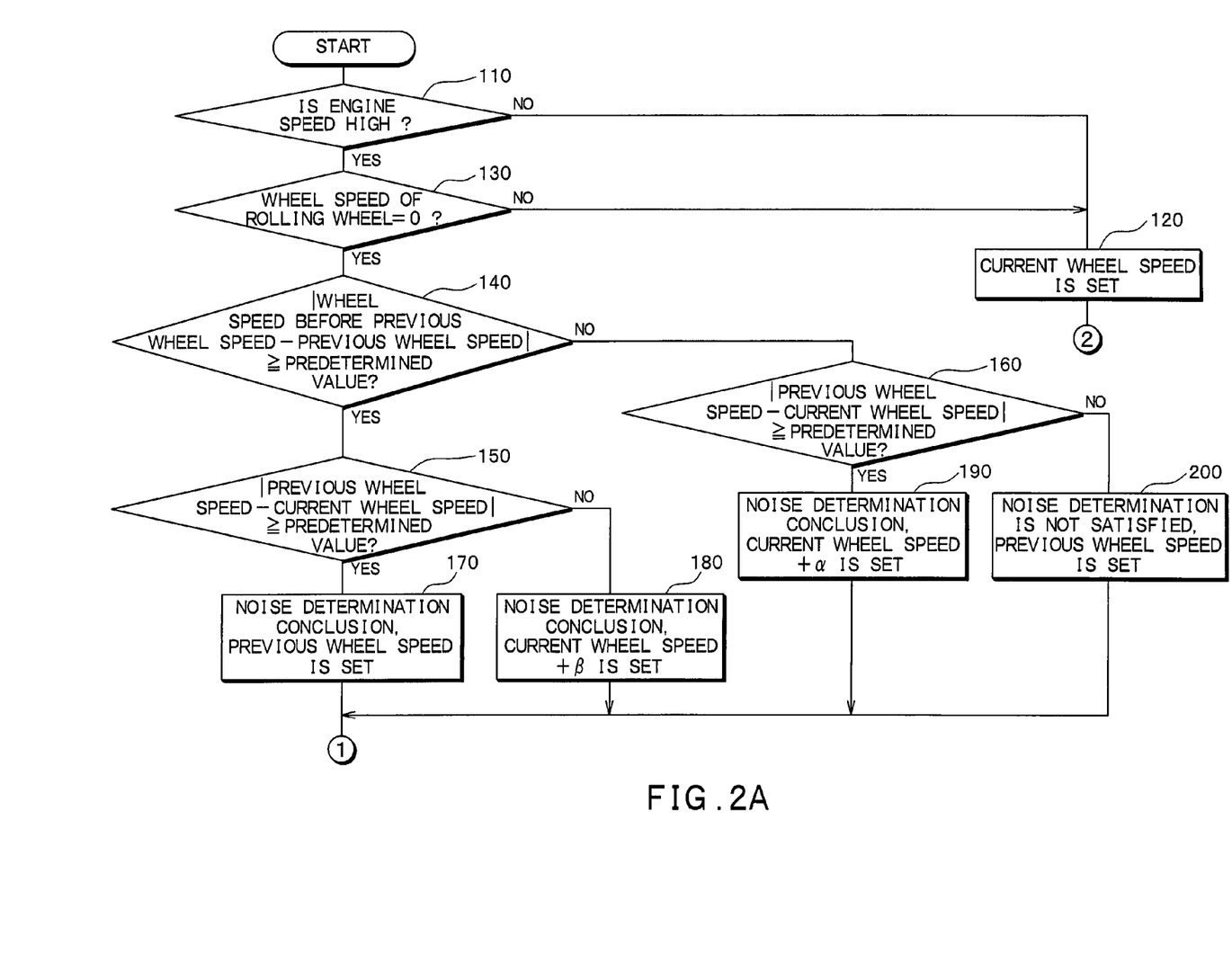
FIG. 2A is a flowchart of a wheel speed setting process.
Figure 2B:
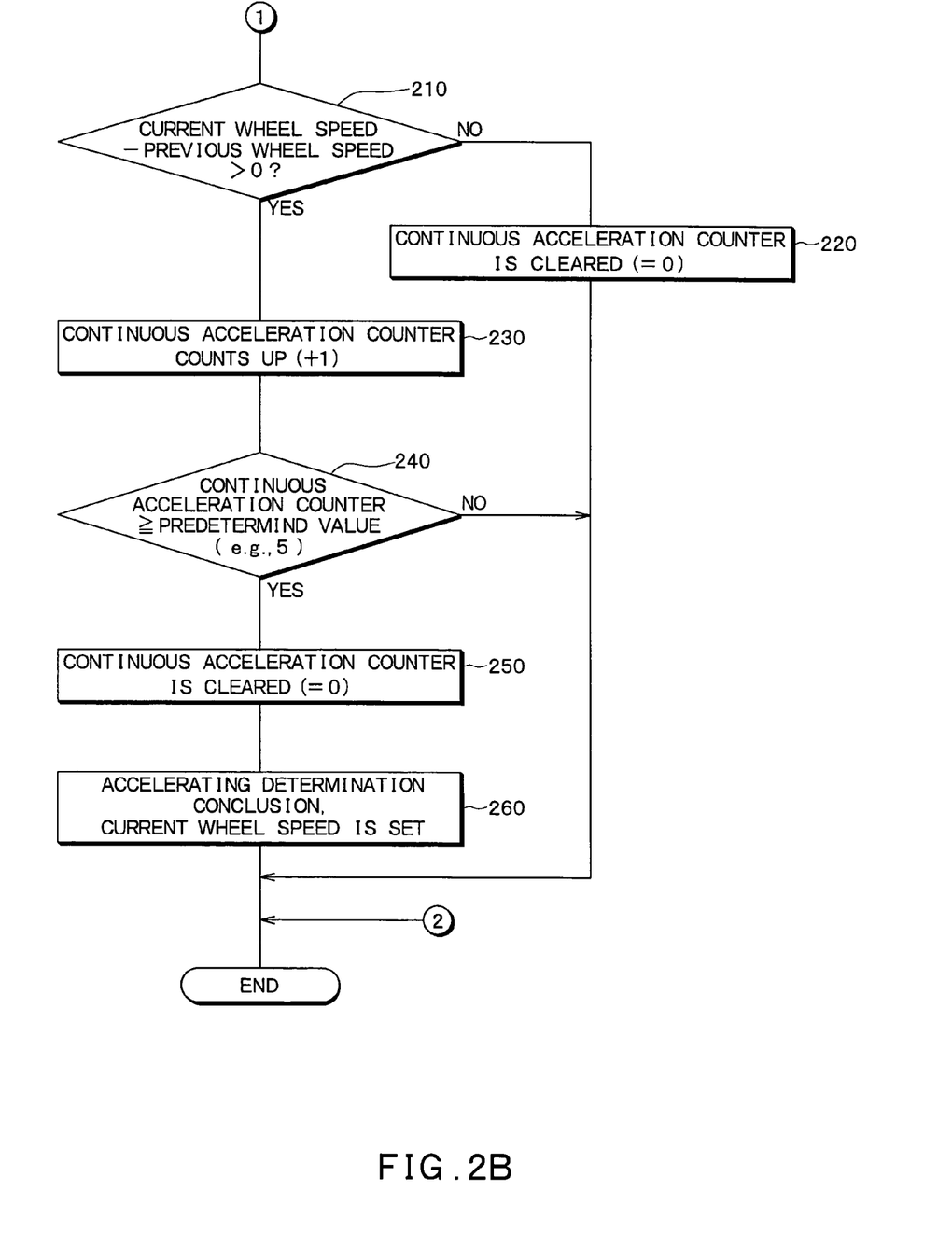
FIG. 2B is a flowchart of the wheel speed setting process continued from FIG. 2A.

The wheel speed setting process illustrated in FIGS. 2A and 2B is executed by at least one of the brake ECU 3 and the PCM 4 at the same time an ignition switch (not shown) mounted in the vehicle cabin is turned on. Furthermore, the process is executed for each drive wheel every time the brake ECU 3 calculates the wheel speed, for example, in 6 ms control cycles.

First, at 110, it is determined whether the engine speed found by the PCM 4 based upon the detection output from the engine speed sensor 2 is high. More specifically, it is determined whether the engine speed is equal to or greater than a preset specified speed (for example, 3500 rpm). If the engine speed is not equal to or greater than the specified speed, the effect of racing noise is assumed small, and the process proceeds to processing at 120. At 120, the wheel speed newly calculated by the brake ECU 3, based upon the detection output of the wheel speed sensors 1$a$-1$d$ disposed in the drive wheel, is set as the regular wheel speed for each drive wheel.

If an affirmative determination is made at 110, the process proceeds to processing at 130. The process from 130 onward is equivalent to a racing noise detection process. Whether the wheel speed of the drive wheel is generated due to the effect of racing noise is detected, and the wheel speed of the drive wheel is corrected accordingly.

More specifically, at 130, it is determined whether the wheel speed of a rolling wheel is zero. This determination is made according to the wheel speed newly calculated by the brake ECU 3 based upon the detection output of the wheel speed sensors 1$a$-1$d$ disposed in the rolling wheel. A negative determination indicates the vehicle is already in a traveling state. Therefore, it is assumed that the wheel speed generated by the drive wheel is not caused by racing noise, and the process proceeds to processing at 120. At 120, the newly calculated wheel speed is set as the regular wheel speed as described above. If an affirmative determination is made, the process proceeds to processing at 140. Note that a unit of the brake ECU 3 executing this process is equivalent to a vehicle stop determination mechanism.

At 140, it is determined whether the absolute value of the difference between a previously calculated wheel speed (hereinafter referred to as a previous wheel speed) and a wheel speed calculated prior to the previous wheel speed (hereinafter referred to as a wheel speed before the previous wheel speed) is equal to or greater than a predetermined value. The process determines whether there is a sudden change in the wheel speed during the interval between the previous control cycle and the control cycle before the previous control cycle. In other words, this process determines whether there is sudden change in the wheel speed, since there is a high possibility that such a sudden change is due to the effect of racing noise.

If an affirmative determination is made at 140, the process proceeds to processing at 150; the process proceeds to processing at 160 in the case of a negative determination. At 150 and 160, it is determined whether the absolute value of the difference between the previous wheel speed and a newly calculated wheel speed (hereinafter referred to as a current wheel speed) is equal to or greater than a predetermined value. This process determines whether there is a sudden change in the wheel speed during the interval between the previous control cycle and the current control cycle.

In the case of an affirmative determination at 150, it is assumed that the sudden change in wheel speed is due to the effect of racing noise. This assumption is made because there is a sudden change in the wheel speed in both the interval between the new and previous control cycles, and the interval between the previous control cycle and the cycle before the previous control cycle. Therefore, the wheel speed of the control cycle before the previous control cycle is set as the official wheel speed of the drive wheel at 170.

In the case of a negative determination at 150, although there is a sudden change in the wheel speed during the interval between the previous control cycle and the control cycle before the previous control cycle, there is no sudden change between the previous and new control cycles. Therefore, it is assumed that the wheel speed is somewhat reliable, albeit with a possibility that racing noise is present. However, the wheel speed is not considered completely reliable. Consequently, at 180, the wheel speed is set to a value in which a predetermined value β (for example, −0.5 km/h) is added to the current wheel speed. In other words, a value smaller than the current wheel speed is set as the official wheel speed of the drive wheel.

In the case of an affirmative determination at 160, although there is no sudden change in the wheel speed during the interval between the previous control cycle and the control cycle before the previous control cycle, there is a sudden change between the previous and new control cycles. Therefore, it is assumed that the wheel speed is somewhat reliable, albeit with a possibility that racing noise is present. Consequently, in this case as well, the wheel speed is not considered completely reliable. Thus, at 190, the wheel speed is set to a value in which a predetermined value α (for example, −1.0 km/h) is added to the current wheel speed. In other words, a value smaller than the current wheel speed is set as the official wheel speed of the drive wheel.

The size relationship of the predetermined value α and the predetermined value β is set based on whichever has the higher possibility of racing noise: the sudden change in wheel speed during the interval between the previous control cycle and the control cycle before the previous control cycle, or the sudden change in wheel speed during the interval between the previous and new control cycles. The size relationship was set assuming that there is a higher possibility of racing noise in the newer control cycle. However, the sizes of the values may also be reversed or even equivalent.

In the case of a negative determination at 160, there is no sudden change in either the wheel speed during the interval between the previous control cycle and the control cycle before the previous control cycle, or between the previous and new control cycles. Therefore, The wheel speed is considered reliable, and the current wheel speed is set as the official wheel speed of the drive wheel at 200.

Next from 210 onward, an initial start determination process is executed to determine whether the generated wheel speed is due to the effect of racing noise or because the vehicle has actually started traveling.

At 210, it is determined whether the current wheel speed is faster than the previous wheel speed based upon a difference thereof. This process determines whether the wheel speed is accelerating. If the wheel speed is accelerating, the increase in wheel speed may be due to the start of actual travel of the vehicle, instead of only racing noise.

Therefore, the process proceeds to processing at 220 assuming that the wheel speed is generated by the effect of racing noise only in the case where the wheel speed is not accelerating. A continuous acceleration counter is cleared (=0) and the wheel speed setting process is ended. In this case, the wheel speed set before is used as the official wheel speed. In cases where a noise determination is established as described above, the set wheel speed is designated the official wheel speed of the drive wheel.

Meanwhile, if the wheel speed is accelerating, the process proceeds to processing at 230, where the continuous acceleration counter is increased by an increment of one. The process then proceeds to processing at 240, and it is determined whether a count value of the continuous acceleration counter is equal to or greater than a preset predetermined value, for example, 5.

The manner of wheel speed acceleration differs in the case of an increase in wheel speed due to the start of actual travel of the vehicle, and an increase in wheel speed due to the effect of racing noise. Therefore, the process above is executed in order to determine which case is the cause of the increase in wheel speed. In other words, an increase in wheel speed due to the effect of racing noise is a momentary increase, and the wheel speed does not continuously accelerate. More specifically, as described above, the wheel speed setting process is executed for each wheel speed calculation cycle. However, the wheel speed will not continue to accelerate, for example, for 5 control cycles or more when the calculation cycle is, for example, a 6 ms control cycle when the wheel speed acceleration is due to the effect of racing noise.

Accordingly, until the count value of the continuous acceleration counter reaches 5 or more at 240, there is a possibility that the increasing wheel speed is due to the effect of racing noise. Thus, the wheel speed setting process is ended on this assumption. Similar to other cases above, when a noise determination is established, the set wheel speed is designated the official wheel speed of the drive wheel.

In the case of an affirmative determination at 240, the process proceeds to processing at 250 where the continuous acceleration counter is cleared (=0), and subsequently proceeds to processing at 260 where an accelerating determination is established. In other words, it is assumed that the start of vehicle traveling is increasing the wheel speed, thus the value of the newly calculated wheel speed is set as the official wheel speed of the drive wheel.

As described above, in cases where the increase in the wheel speed of the drive wheel appears due to the effect of racing noise, the wheel speed is not used as the official wheel speed in the present embodiment. Therefore, it is possible to assure that the traction control is not executed based upon a wheel speed generated by the effect of racing noise.

Furthermore, when the wheel speed of the drive wheel is increasing, finding out how long the acceleration continues differentiates between cases where the wheel speed is increasing due to the start of travel of the vehicle and cases where the wheel speed is increasing due to the effect of racing noise. Therefore, when the start of actual travel of the vehicle is increasing the wheel speed, it is possible to use the wheel speed value calculated at that time as the official wheel speed of the drive wheel. In addition, the traction control can also be accurately executed in cases where acceleration slip is generated.

It should be noted that the flowcharts shown in the drawings of the present embodiment correspond to mechanisms that execute the various processes.

While the above description is of the preferred embodiments of the present invention, it should be appreciated that the invention may be modified, altered, or varied without deviating from the scope and fair meaning of the following claims.

What is claimed is:

1. A traction control device comprising:
   a wheel speed detection mechanism for detecting a wheel speed of a drive wheel in a vehicle;
   an acceleration slip detection mechanism fix detecting acceleration slip of the drive wheel based upon a wheel speed detected by the wheel speed detection mechanism;
   a driving force reduction mechanism for reducing a driving force transmitted to the drive wheel such that the acceleration slip is suppressed when the acceleration slip is detected by the acceleration slip detection mechanism;
   an engine speed detection mechanism for detecting a speed of an engine mounted in the vehicle; and
   a racing noise determination mechanism for determining whether racing noise has been produced by determining whether the engine speed exceeds a predetermined speed, wherein reduction of the driving force by the driving force reduction mechanism is stopped when it is determined by the racing noise determination mechanism that racing noise is being produced.

2. The traction control device according to claim 1 further comprising:
   a vehicle stop determination mechanism for determining whether the vehicle is stopped, wherein
   the acceleration slip detection mechanism stops detection of the acceleration slip based upon the wheel speed detected by the wheel speed detection mechanism when it is determined by the vehicle stop determination mechanism that the vehicle is stopped.

3. The traction control device according to claim 1, wherein
   the wheel speed is calculated every predetermined control cycle in the wheel speed detection mechanism; and
   in cases where the calculated wheel speed increases and subsequently decreases within a first set of control cycles, the driving force reduction mechanism stops reducing the driving force.

4. The traction control device according to claim 2, wherein
   the wheel speed is calculated every predetermined control cycle in the wheel speed detection mechanism; and
   in cases where the calculated wheel speed increases and subsequently decreases within a first set of control cycles, the driving force reduction mechanism stops reducing the driving force.

5. The traction control device according to claim 1, wherein
   the wheel speed is calculated every predetermined control cycle in the wheel speed detection mechanism; and
   in cases where the calculated wheel speed continues to show an increasing tendency for a second set of control cycles or longer, the driving force reduction mechanism cancels the stopping of the reduction of driving force and starts reducing the driving force.

6. The traction control device according to claim 2, wherein
   the wheel speed is calculated every predetermined control cycle in the wheel speed detection mechanism; and
   in cases where the calculated wheel speed continues to show an increasing tendency for a second set of control cycles or longer, the driving force reduction mechanism cancels the stopping of the reduction of driving force and starts reducing the driving force.

7. The traction control device according to claim 3, wherein the wheel speed is calculated every predetermined control cycle in the wheel speed detection mechanism; and in cases where the calculated wheel speed continues to show an increasing tendency for a second set of control cycles or longer, the driving force reduction mechanism cancels the stopping of the reduction of driving force and starts reducing the driving force.

8. The traction control device according to claim 4, wherein
the wheel speed is calculated every predetermined control cycle in the wheel speed detection mechanism; and
in cases where the calculated wheel speed continues to show an increasing tendency for a second set of control cycles or longer, the driving force reduction mechanism cancels the stopping of the reduction of driving force and starts reducing the driving force.

9. The traction control device according to claim 1, wherein
the wheel speed is calculated every predetermined control cycle in the wheel speed detection mechanism; and
in cases where the calculated wheel speed continues to increase and decrease, the driving force reduction mechanism stops reducing the driving force.

10. The traction control device according to claim 2, wherein
the wheel speed is calculated every predetermined control cycle in the wheel speed detection mechanism; and
in cases where the calculated wheel speed continues to increase and decrease, the driving force reduction mechanism stops reducing the driving force.

11. The traction control device according to claim 3, wherein among the wheel speeds calculated every predetermined control cycle in the wheel speed detection mechanism, in cases where an absolute value of a difference between a current wheel speed newly calculated and a previous wheel speed previously calculated is equal to or greater than a predetermined value, and an absolute value of a difference between the previous wheel speed and a wheel speed before the previous wheel speed, which is calculated prior to the previous wheel speed, is equal to or greater than the predetermined value, the wheel speed before the previous wheel speed is set as a new wheel speed; thus stopping reduction of the driving force by the driving force reduction mechanism.

12. The traction control device according to claim 5, wherein among the wheel speeds calculated every predetermined control cycle in the wheel speed detection mechanism, in cases where an absolute value of a difference between a current wheel speed newly calculated and a previous wheel speed previously calculated is equal to or greater than a predetermined value, and an absolute value of a difference between the previous wheel speed and a wheel speed before the previous wheel speed, which is calculated prior to the previous wheel speed, is equal to or greater than the predetermined value, the wheel speed before the previous wheel speed is set as a new wheel speed; thus stopping reduction of the driving force by the driving force reduction mechanism.

13. The traction control device according to claim 9, wherein among the wheel speeds calculated every predetermined control cycle in the wheel speed detection mechanism, in cases where an absolute value of a difference between a current wheel speed newly calculated and a previous wheel speed previously calculated is equal to or greater than a predetermined value, and an absolute value of a difference between the previous wheel speed and a wheel speed before the previous wheel speed, which is calculated prior to the previous wheel speed, is equal to or greater than the predetermined value, the wheel speed before the previous wheel speed is set as a new wheel speed; thus stopping reduction of the driving force by the driving force reduction mechanism.

14. The traction control device according to claim 11, wherein a value smaller than the current wheel speed is set as the new wheel speed in the wheel speed detection mechanism, in one of a case where the absolute value of the difference between the current wheel speed and the previous wheel speed is equal to or greater than the predetermined value, and a case where the absolute value of the difference between the previous wheel speed and the wheel speed before the previous wheel speed is equal to or greater than the predetermined value;
thus stopping reduction of the driving force by the driving force reduction mechanism.

15. The traction control device according to claim 12, wherein a value smaller than the current wheel speed is set as the new wheel speed in the wheel speed detection mechanism, in one of a case where the absolute value of the difference between the current wheel speed and the previous wheel speed is equal to or greater than the predetennined value, and a case where the absolute value of the difference between the previous wheel speed and the wheel speed before the previous wheel speed is equal to or greater than the predetennined value;
thus stopping reduction of the driving force by the driving force reduction mechanism.

16. The traction control device according to claim 13, wherein a value smaller than the current wheel speed is set as the new wheel speed in the wheel speed detection mechanism, in one of a case where the absolute value of the difference between the current wheel speed and the previous wheel speed is equal to or greater than the predetermined value, and a case where the absolute value of the difference between the previous wheel speed and the wheel speed before the previous wheel speed is equal to or greater than the predetennined value;
thus stopping reduction of the driving force by the driving force reduction mechanism.

17. The traction control device according to claim 11, wherein the current wheel speed is set as the new wheel speed in the wheel speed detection mechanism, in cases where the absolute value of the difference between the current wheel speed and the previous wheel speed is smaller than the predetermined value, and the absolute value of the difference between the previous wheel speed and the wheel speed before the previous wheel speed is smaller than the predetermined value.

18. The traction control device according to claim 12, wherein the current wheel speed is set as the new wheel speed in the wheel speed detection mechanism, in cases where the absolute value of the difference between the current wheel speed and the previous wheel speed is smaller than the predetermined value, and the absolute value of the difference between the previous wheel speed and the wheel speed before the previous wheel speed is smaller than the predetermined value.

19. The traction control device according to claim 13, wherein the current wheel speed is set as the new wheel speed in the wheel speed detection mechanism, in cases where the absolute value of the difference between the current wheel speed and the previous wheel speed is smaller than the predetermined value, and the absolute value of the difference between the previous wheel speed and the wheel speed before the previous wheel speed is smaller than the predetermined value.

20. The traction control device according to claim 14, wherein the current wheel speed is set as the new wheel speed in the wheel speed detection mechanism, in cases where the absolute value of the difference between the current wheel speed and the previous wheel speed is smaller than the predetermined value, and the absolute value of the difference between the previous wheel speed and the wheel speed before the previous wheel speed is smaller than the predetermined value.

21. The traction control device according to claim 15, wherein the current wheel speed is set as the new wheel speed in the wheel speed detection mechanism, in cases where the absolute value of the difference between the current wheel speed and the previous wheel speed is smaller than the predetermined value, and the absolute value of the difference between the previous wheel speed and the wheel speed before the previous wheel speed is smaller than the predetermined value.

22. The traction control device according to claim 16, wherein the current wheel speed is set as the new wheel speed in the wheel speed detection mechanism, in cases where the absolute value of the difference between the current wheel speed and the previous wheel speed is smaller than the predetermined value, and the absolute value of the difference between, the previous wheel speed and the wheel speed before the previous wheel speed is smaller than the predetermined value.

* * * * *